(12) United States Patent
Wells (10) Patent No.: US 10,486,946 B1
(45) Date of Patent: *Nov. 26, 2019

(54) HEAVY COMPRESSOR VALVE LIFTING TOOL AND ASSOCIATED METHODS

(71) Applicant: MARKWEST ENERGY PARTNERS, L.P., Denver, CO (US)

(72) Inventor: Ernie Wells, Summerfield, OH (US)

(73) Assignee: MARKWEST ENERGY PARTNERS, L.P., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/221,701

(22) Filed: Dec. 17, 2018

Related U.S. Application Data (63) Continuation of application No. 15/907,582, filed on Feb. 28, 2018, now Pat. No. 10,196,243.

(60) Provisional application No. 62/465,012, filed on Feb. 28, 2017.

(51) Int. Cl.
| | |
|---|---|
| *B66C 17/06* | (2006.01) |
| *B66C 1/62* | (2006.01) |
| *B66C 1/22* | (2006.01) |
| *B23P 6/00* | (2006.01) |
| *F04B 39/14* | (2006.01) |
| *F04B 53/22* | (2006.01) |
| *F04B 53/10* | (2006.01) |

(52) U.S. Cl.
CPC ............... *B66C 17/06* (2013.01); *B66C 1/62* (2013.01); *F04B 39/14* (2013.01); *F04B 53/22* (2013.01); *B23P 6/00* (2013.01); *B66C 1/22* (2013.01); *F04B 53/10* (2013.01)

(58) Field of Classification Search
CPC ........... B66C 1/62; B66C 1/625; B66C 17/06; B66C 1/22; B66C 1/24; B66C 1/28–30; B66C 1/34; B66C 1/42; B66C 9/00; B66C 11/12; B66C 17/00; B23P 6/00; B23P 19/04; F04B 53/10; F04B 39/14; F04B 53/22; Y10T 29/53552; Y10T 29/53596; Y10T 29/49721; B25B 27/24

See application file for complete search history.

(56) References Cited

U.S. PATENT DOCUMENTS

| | | |
|---|---|---|
| 3,593,555 A | 7/1971 | Grosko |
| 3,961,493 A | 6/1976 | Nolan, Jr. |
| 4,073,303 A | 2/1978 | Foley, Jr. |
| 4,457,037 A | 7/1984 | Rylander |
| 5,595,709 A | 1/1997 | Klemp |
| 5,962,774 A | 10/1999 | Mowry |
| 6,022,421 A | 2/2000 | Bath |
| 6,478,353 B1 | 11/2002 | Barrozo |

(Continued)

*Primary Examiner* — Matthew P Travers
(74) *Attorney, Agent, or Firm* — Hogan Lovells US LLP (57) ABSTRACT

Embodiments of a heavy compressor valve removal tool to remove and lift heavy compressor valves and associated methods are provided. An embodiment of a heavy-compressor valve removal tool can include one or more valve interfacing surfaces to position along, interface with, and abuttingly contact a plurality of outer surfaces when positioned around a perimeter of a compressor valve. The tool also can include one or more reinforcing arms connected to the one or more valve interfacing surfaces to reinforce the one or more valve interfacing surfaces when lifting the heavy compressor valve and one or more tool lifting arms connected to the one or more reinforcing arms to lift the heavy compressor valve from a designated position when the tool is positioned around a perimeter of the heavy compressor valve.

12 Claims, 10 Drawing Sheets

(56) References Cited

U.S. PATENT DOCUMENTS

| | | |
|---|---|---|
| 6,834,531 B2 | 12/2004 | Rust |
| 7,749,308 B2 | 7/2010 | McCully |
| 7,815,744 B2 | 10/2010 | Abney et al. |
| 8,376,432 B1 | 2/2013 | Hagler et al. |
| 8,413,484 B2 | 4/2013 | Lubkowitz |
| 9,175,235 B2 | 11/2015 | Kastner |
| 9,310,016 B2 | 4/2016 | Hodde |
| 9,329,066 B2 | 5/2016 | Skarping |
| 2006/0125826 A1 | 6/2006 | Lubkowitz |
| 2012/0185220 A1 | 7/2012 | Shippen |
| 2014/0008926 A1 | 1/2014 | Allen |
| 2014/0176344 A1 | 6/2014 | Littlestar |
| 2014/0345370 A1 | 11/2014 | Marotta |
| 2015/0183102 A1 | 7/2015 | Breschi et al. |
| 2015/0323119 A1 | 11/2015 | Giunta |
| 2016/0091467 A1 | 3/2016 | Morris |
| 2016/0169436 A1 | 6/2016 | Sander et al. |
| 2016/0175634 A1 | 6/2016 | Radian |
| 2016/0363249 A1 | 12/2016 | Disher |
| 2016/0369930 A1 | 12/2016 | Poe et al. |
| 2017/0088401 A1 | 3/2017 | Clements et al. |

HEAVY COMPRESSOR VALVE LIFTING TOOL AND ASSOCIATED METHODS

CROSS-REFERENCE TO RELATED PATENT APPLICATIONS

This application is a continuation, and claims priority to, and the benefit of, U.S. Non-Provisional application Ser. No. 15/907,582, filed Feb. 28, 2018, titled "Heavy Compressor Valve Lifting Tool and Associated Methods," which claims priority to U.S. Provisional Patent Application. No. 62/465,012, filed Feb. 28, 2017, titled "Heavy Compressor Valve Lifting Tool and Associated Methods," each of which is incorporated herein by reference in their entireties.

BACKGROUND OF THE INVENTION

1. Field of the Invention

This technology relates to compressor valves used in large industrial compressors and other machinery. In particular, this technology relates to lifting tools for compressor valves.

2. Brief Description of Related Art

Compressor valves used in large industrial compressors and other machinery can be quite heavy and often weigh 50 pounds or more. These heavy compressor valves often are positioned in inconvenient locations on industrial compressors and require removal for maintenance and other needs. For a person to lift such a valve, it can take an enormous amount of strength or entail other requirements. If such maintenance or other removal needs occur frequently, the valves and the associated compressor or other machinery may be subject to wear or damage. Additionally, it may be a challenging task for onsite personnel to perform. These problems are exacerbated when the heavy compressor valves are mounted in awkward positions.

SUMMARY

In view of the foregoing, a need was recognized for an enhanced heavy compressor valve lifting tool that reduces risk of wear and damage to the valves, the compressors, or other associated machinery and makes the task easier and safer for operators.

Embodiments of an enhanced heavy compressor valve removal tool to remove and lift heavy compressor valves and associated methods are provided. An embodiment of a heavy compressor valve removal tool can include one or more valve interfacing surfaces to position along, interface with, and abuttingly contact a plurality of outer surfaces when positioned around a perimeter of a compressor valve. The tool also can include one or more reinforcing arms connected to the one or more valve interfacing surfaces to reinforce the one or more valve interfacing surfaces when lifting the heavy compressor valve and one or more tool lifting arms connected to the one or more reinforcing arms to lift the heavy compressor valve from a designated position when the tool is positioned around a perimeter of the heavy compressor valve. An embodiment of a heavy compressor valve lifting tool further can include the one or more valve interfacing surfaces having an extended arcuate surface to position along, interface with, abuttingly contact and substantially surround an outer arcuate surface of the heavy compressor valve. An embodiment of the extended arcuate-shaped interface surface, for example, can include a substantially annular shape, and an embodiment of the one or more reinforcing arms connect to a medial portion thereof and extends substantially across the diameter of the annular shape. An embodiment of the one or more tool lifting arms can include a distal end connected to the one or more reinforcing arms.

An embodiment of a method of lifting a heavy compressor valve with a heavy compressor valve lifting tool can include positioning portions of the heavy compressor valve lifting tool to abuttingly contact outer surfaces of a perimeter of a compressor valve when in a first position. The method also can include securing the portions of the heavy compressor valve lifting tool on the outer surfaces of the perimeter of the heavy compressor valve so as to reduce slippage of the portions when lifted, and elevating the heavy compressor valve from the first position with a lifting mechanism connected to a proximal end portion of the heavy compressor valve lifting tool and to a second position different from the first position. The method further can include elevating the heavy compressor valve with the heavy compressor valve lifting tool from a third position to a fourth position, and lowering the heavy compressor valve from the third position to the first position to thereby return to the heavy compressor valve to the first position.

BRIEF DESCRIPTION OF THE DRAWINGS

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

DETAILED DESCRIPTION

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a," "an," "the," and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions.

The present disclosure provides tools and methods for machine lifting compressor valves to remove a valve from a compressor, place a valve on a compressor, or other applications that require lifting or moving of a compressor valve. The systems and methods are particularly advantageous for heavy compressor valves that are difficult to remove by hand.

Figure 1A:
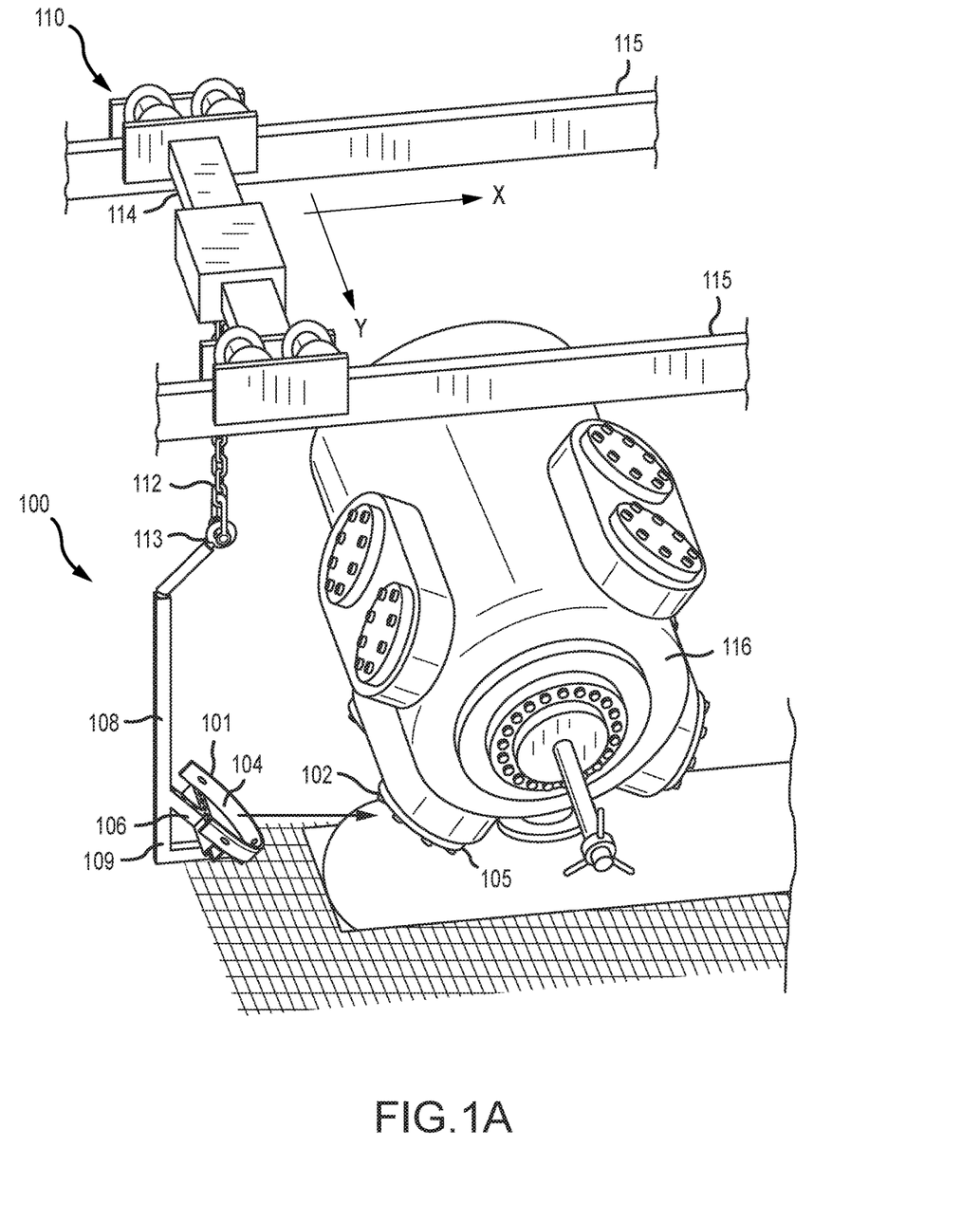
FIG. 1A is a perspective view of a compressor valve lifting tool before making contact with a compressor valve, in accordance with embodiments of the present disclosure.
Figure 1B:
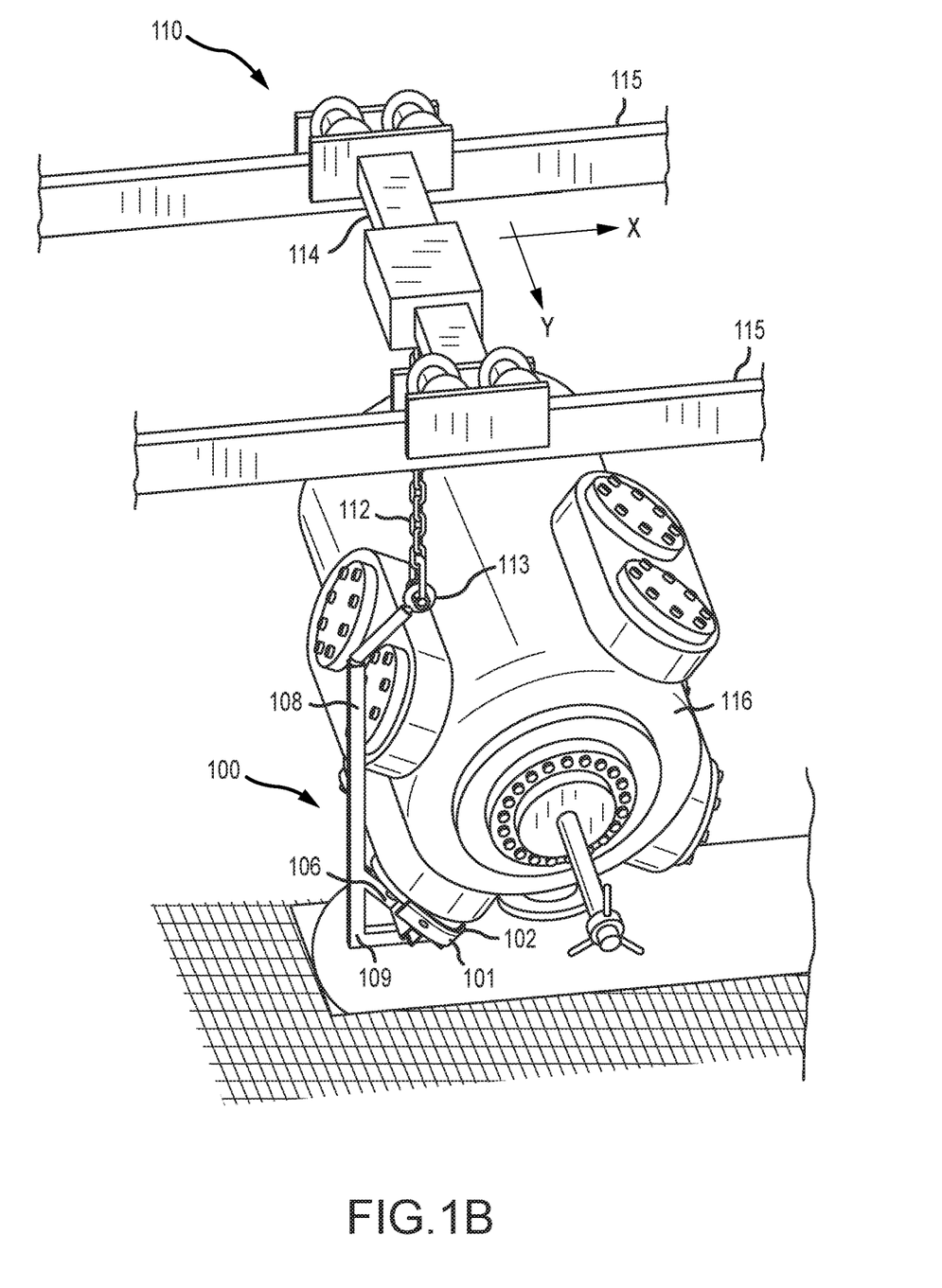
FIG. 1B is a perspective view of a compressor valve lifting tool in contact with a compressor valve, in accordance with embodiments of the present disclosure.
Figure 1C:
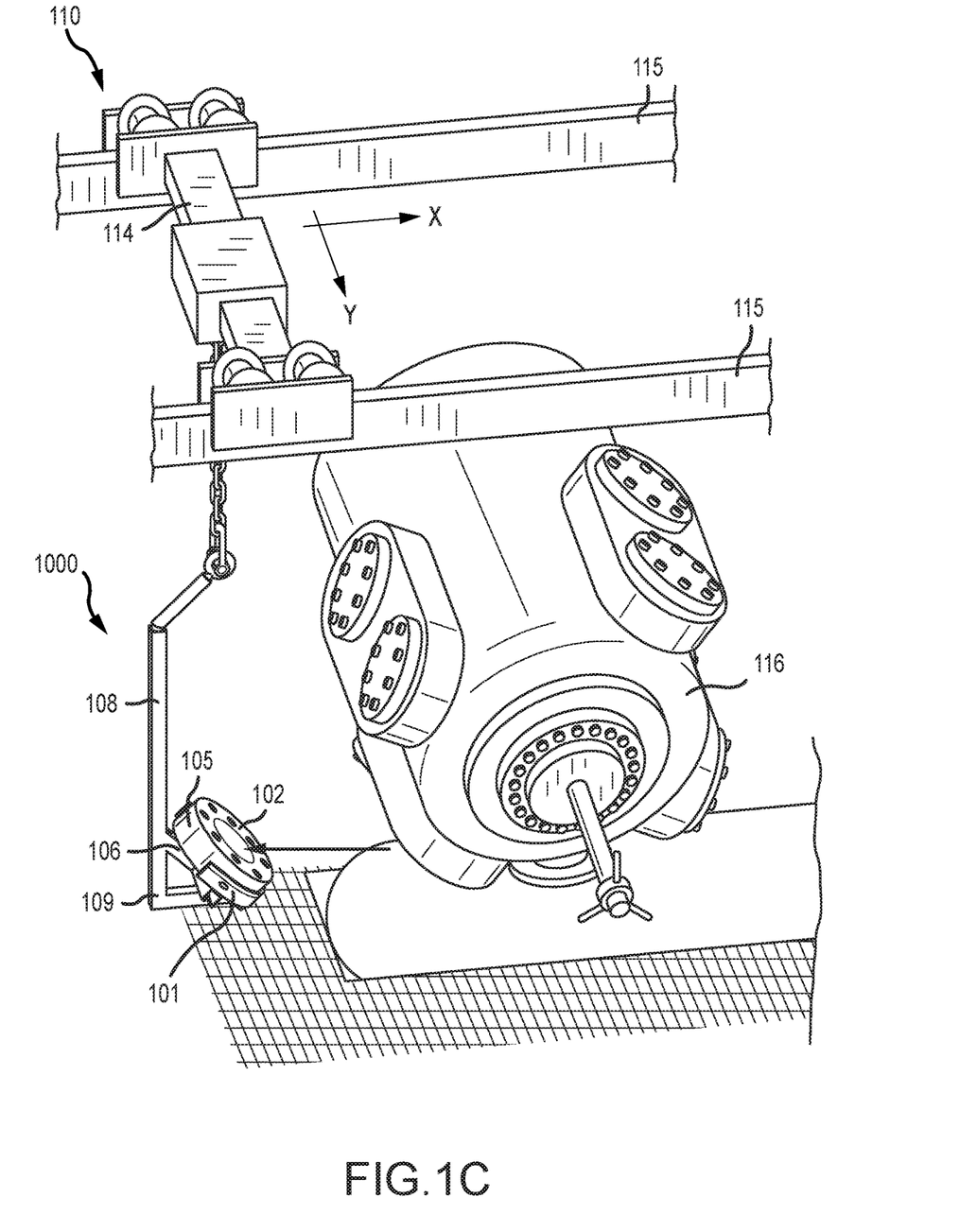
FIG. 1C is a perspective view of a compressor valve lifting tool removing a compressor valve, in accordance with embodiments of the present disclosure.
Figure 1D:
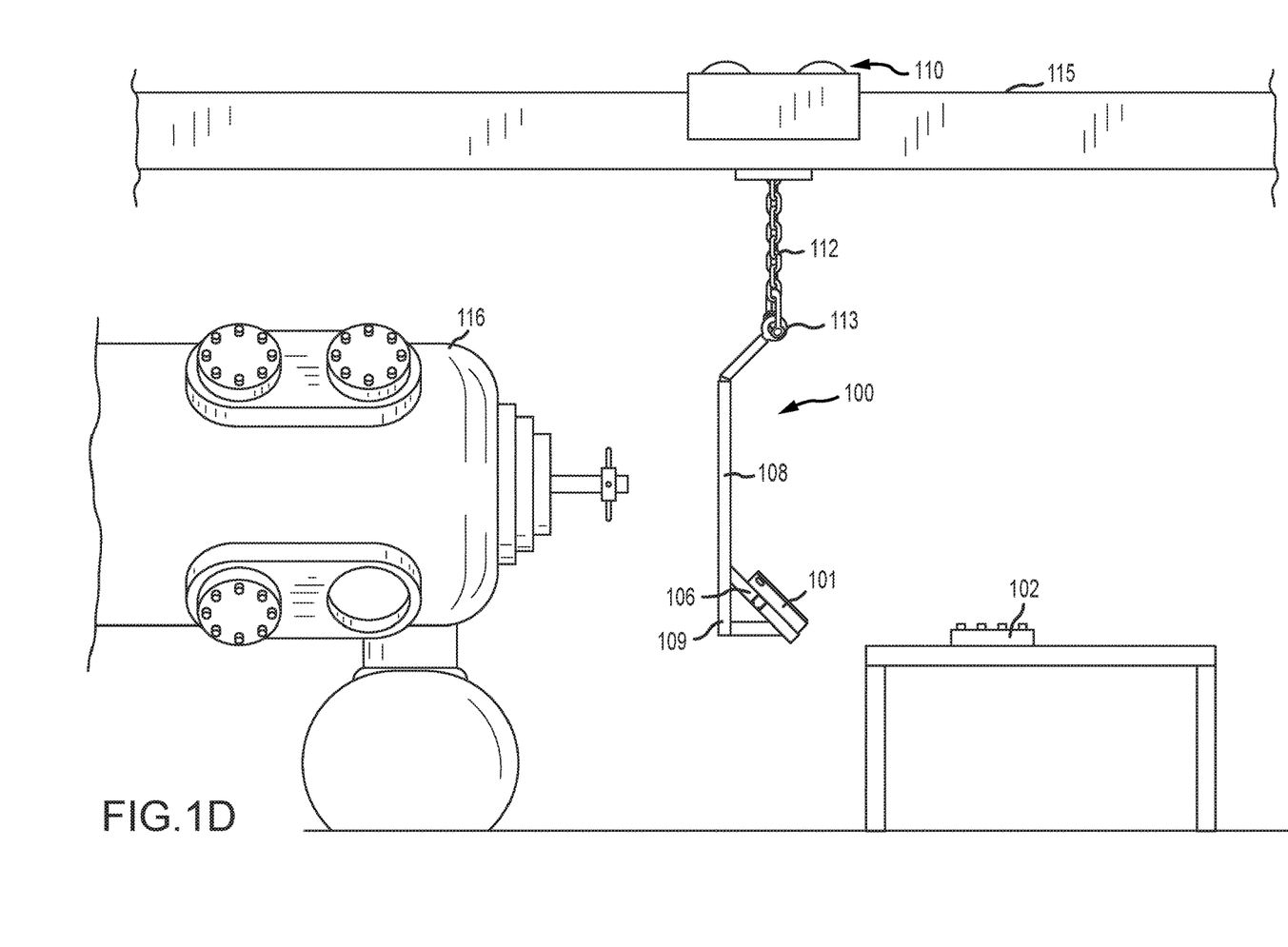
FIG. 1D is a perspective view of a compressor valve lifting tool moving a compressor valve to designated location, in accordance with embodiments of the present disclosure.
Figure 2A:
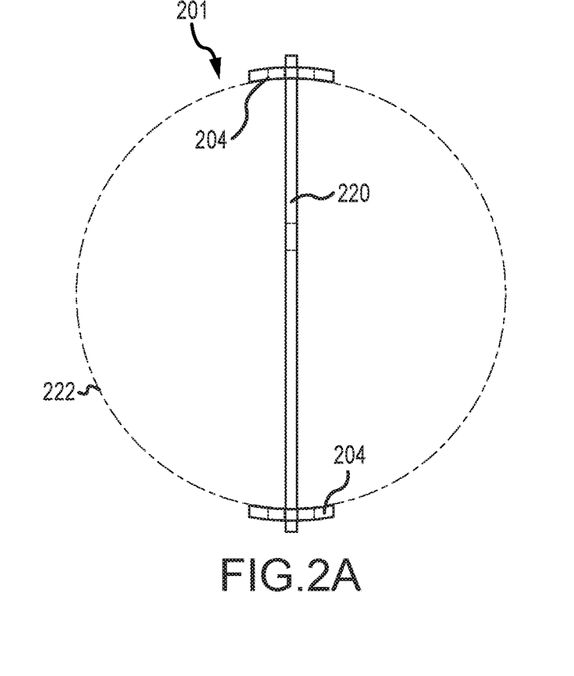
FIGS. 2A-2D are top, side, cross-sectional, and perspective views, respectively, of an embodiment of a valve interfacing device, in accordance with embodiments of the present disclosure.
Figure 2B:
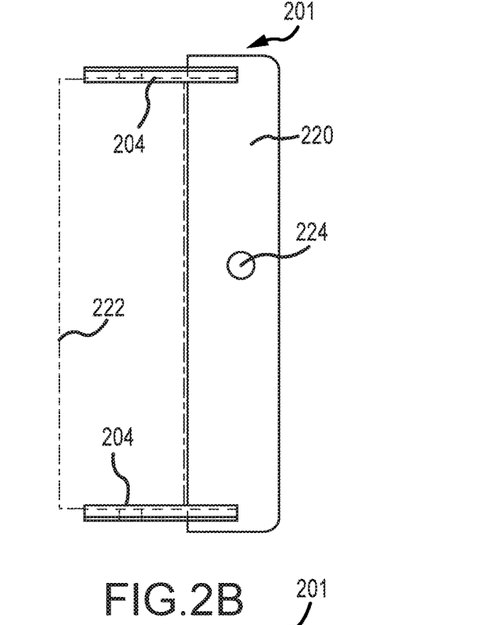
Figures 2C, 2D:
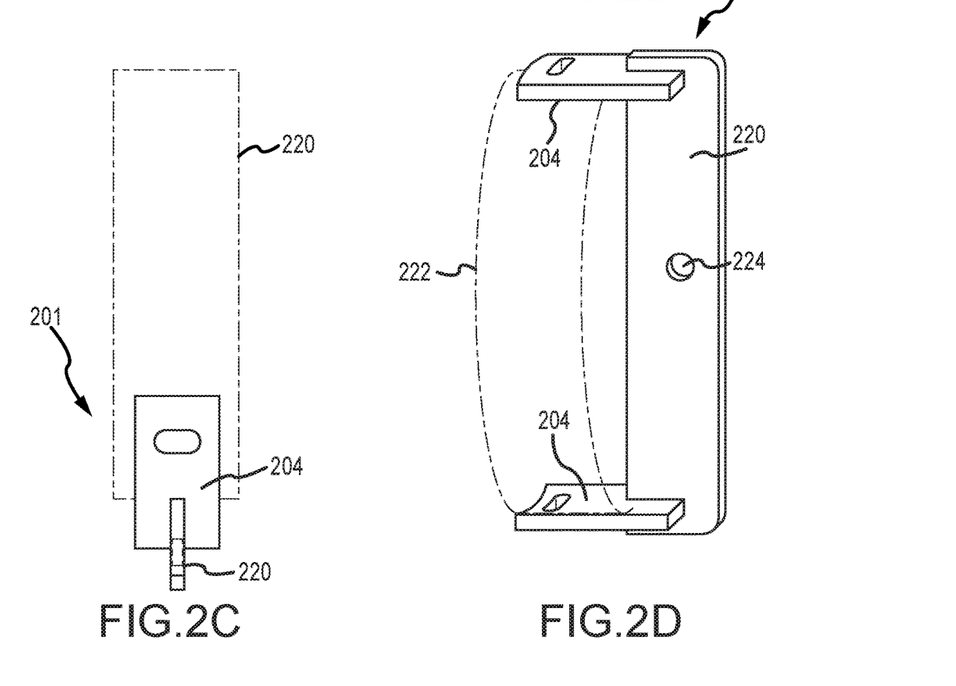
Figure 3A:
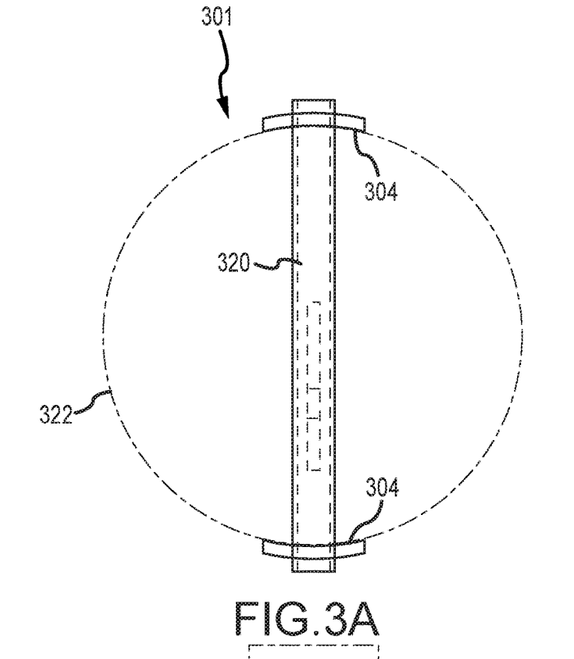
FIGS. 3A-3D are top, side, cross-sectional, and perspective views, respectively, of another embodiment of a valve interfacing device, in accordance with embodiments of the present disclosure.
Figure 3B:
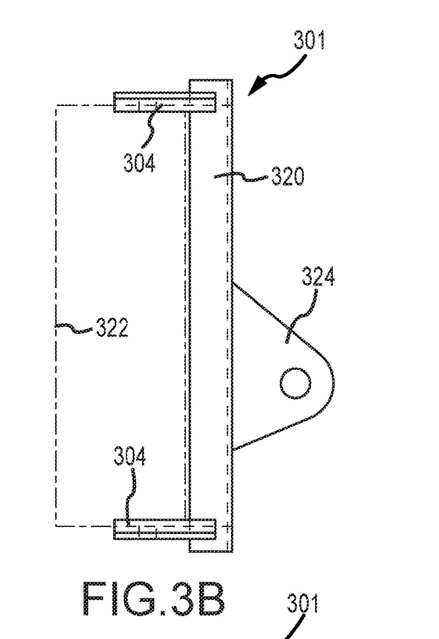
Figure 3C:
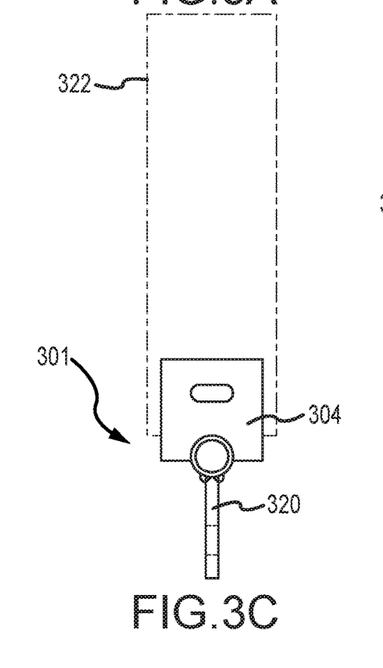
Figure 3D:
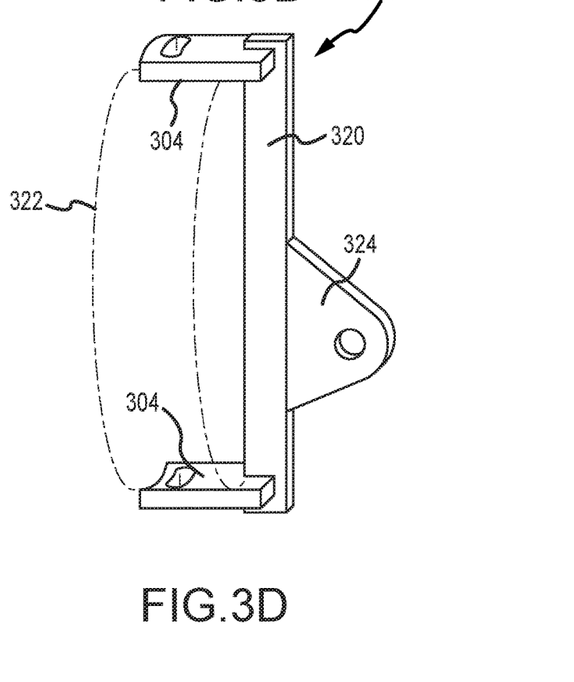

FIGS. 1A-1D illustrate a compressor valve lifting tool 100 at various stages of a valve removal process. Specifically, FIG. 1A illustrates the lifting tool 100 prior to engaging a compressor valve 102. FIG. 1B illustrates the lifting tool 100 engaged with the compressor valve 102. FIG. 1C illustrates the lifting tool 100 having removed the compressor valve 102 from the compressor. FIG. 1D illustrates the lifting tool 100 having moved and placed the removed compressor valve 102 on a table.

Referring to FIGS. 1A-1D, the lifting tool 100 may include a valve interfacing device 101 having one or more valve interfacing surfaces 104 for engaging and gripping the compressor valve 102. In some embodiments, the compressor valve 102 is substantially heavy, weighing at least 50 Lbs. In some other embodiments, the compressor valve 102 may weigh less than 50 lbs. The interfacing surfaces 104 may have an arcuate shape for conforming to an outer profile of the compressor valve 102. FIG. 1A illustrates the interfacing surfaces 104 without the compressor valve 102, and FIG. 1C illustrates the interfacing surfaces 104 gripped around the compressor valve 102. Specifically, in some embodiments, the valve interfacing surfaces 104 position along, interface with, and abuttingly contact a plurality of outer surfaces when positioned around a perimeter 105 of the compressor valve 102.

The interfacing surfaces 104 are coupled to one or more reinforcing arms 106. In some embodiments, the interfacing surfaces 104 are positioned on top of the reinforcing arm 106. The reinforcing arms 106 may be oriented to position the interfacing surfaces 104 at an angle to facilitate engagement with the valve 102. The reinforcing arms 106 may also provide added support to reinforce the interfacing surfaces 104 when lifting the heavy compressor valve 102.

Both the interfacing surfaces 104 and the reinforcing arms 106 are suspended from and located at a distal end 109 of a tool lifting arm 108. The tool lifting arm 108 is connected to the one or more reinforcing arms 106 to position the interfacing surfaces 104 in alignment with the compressor valve 102 and lift the compressor valve 102 from a designated position when the valve interfacing surface 104 is positioned around a perimeter of the compressor valve 102.

In some embodiments, the lifting tool 100 may be coupled to a lifting mechanism 110 that provides the power and motion to lift the valve 102 during a lifting operation. In one or more embodiments, the tool lifting arm 108 is coupled to and suspended from the lifting mechanism 110 via a chain of one or more links 112 at the proximal end 113 of the tool lifting arm 108. The lifting mechanism 110 may include a multidirectional drive mechanism that moves the tool lifting arm 108. In some embodiments, the drive mechanism can move the lifting mechanism along two dimensions, such as along the X axis and the Y axis. Specifically, in some embodiments, the lifting mechanism 110 may be coupled to one or more guide rails 115 on which it is driven. The guide rails 115 provide both a suspension structure for the lifting tool 100 and path of motion along the X axis. As secondary rail 114 extending perpendicularly to the guide rails 115 provides a path of motion along the Y axis. Further, in some embodiments, the lifting mechanism 110 can lift or lower the interfacing surfaces 104 to provide a third dimension of motion. Thus, the lifting mechanism 110 can be moved anywhere within in a three dimensional space to position the interfacing surfaces 104 in alignment with a compressor valve for removal and placement. In some embodiments, the lifting mechanism 110 may include an industrial crane to connect to the tool lifting arm 108 via link 112 to thereby lift the heavy compressor valve 102 during operation of the industrial crane.

In some embodiments, during a compressor valve 102 removal operation, such as shown in FIGS. 1A-1D, the lifting tool 100 is positioned with respect to a compressor 116 having one or more valves 102 attached thereto. Specifically, with reference to FIG. 1A, the lifting tool 100 is positioned to place the interfacing surfaces 104 into alignment with compressor valve 102 to be removed. Then, the lifting tool 100 is moved towards to compressor valve 102. Referring to FIG. 1B, the interfacing surfaces 104 are then placed into engagement with the compressor valve 102, in which the interfacing surfaces 104 abuttingly contact outer surfaces of a perimeter 105 of the compressor valve 102. The interfacing surfaces 104 are then secured to the outer surfaces of the perimeter 105 of the compressor valve 102 so as to reduce slippage when the compressor valve 102 is lifted. Such securement may be performed by personnel, by another tool, or automatically by the lifting tool 100. Referring to FIG. 1C, the lifting tool 100 is then moved away from the compressor 116 with the valve 102 attached to the interfacing surfaces 104, thereby removing the valve 102 from the compressor 116. The lifting tool 100 may then be controlled to elevate or move the valve 102 to a second location from a first location, as illustrated in FIG. 1D. The lifting tool 100 may further move the valve 102 to additional locations or positions. The lifting tool 100 may also reverse the path and move the valve 102 back to its original position, such as back onto the compressor 116.

FIGS. 2A-2D illustrate top, side, cross-sectional, and perspective views, respectively, of an embodiment of a valve interfacing device 201. In this embodiment, the valve interfacing device 201 includes a support beam 220 and a plurality (e.g., 2) of valve interfacing surfaces 204 mounted onto the support beam 220. Each of the interfacing surfaces 204 includes at least an arcuate portion having a curvature complementary to the curvature of the outer perimeter of a compressor valve (e.g., compressor valve 102) to which the interfacing device 201 is designed to engage. In some embodiments, the interfacing surfaces 204 position along, interface with, and abuttingly contact one or more arcuate-shaped outer surfaces of the compressor valve. In some embodiments, the interfacing surfaces 204 may include an extended arcuate portion that extends further along the curvature. When the interfacing device 201 engages a compressor valve, the compressor valve, represented by dashed line 222, is positioned within or between the interfacing surfaces 204. The support beam 220 may include an attachment feature such as an aperture 224 for attaching the interfacing device 201 to the reinforcing arms 106 (FIG. 1A).

FIGS. 3A-3D illustrate top, side, cross-sectional, and perspective views, respectively, of an embodiment of a valve interfacing device 301. In this embodiment, the valve interfacing device 301 includes a support beam 320 and a plurality (e.g., 2) of valve interfacing surfaces 304 mounted onto the support beam 320. The embodiment of FIGS. 3A-3D features a support beam 320 with an extended tab 324 that includes an attachment feature such as aperture 324.

Figure 4A:
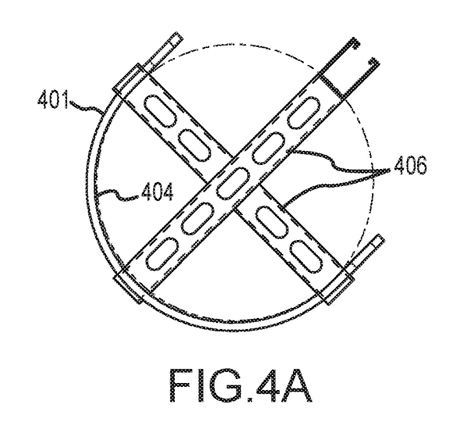
FIG. 4A is a top view of another embodiment of a valve interfacing device, in accordance with embodiments of the present disclosure.
Figure 4B:
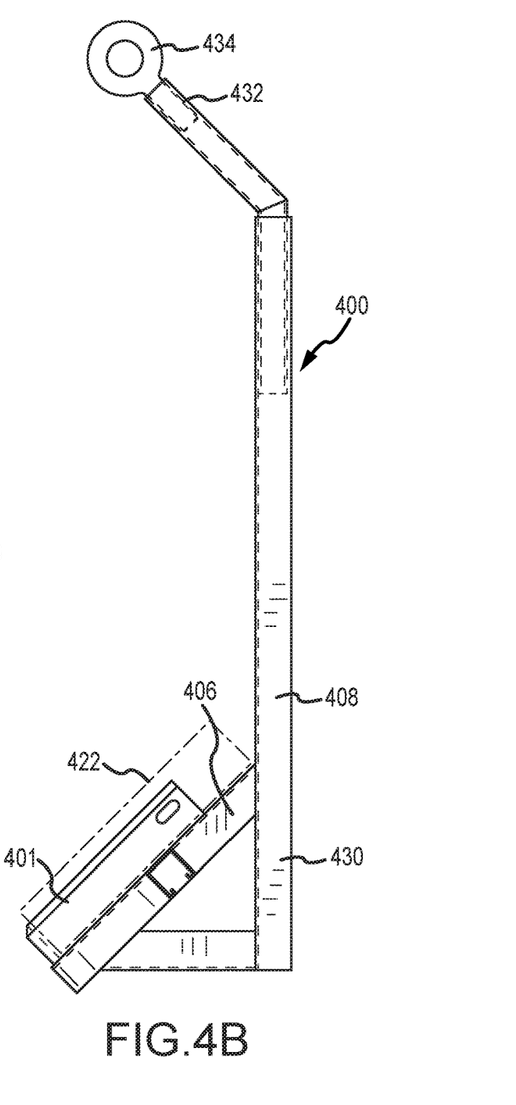
FIG. 4B is a side view of a lifting tool, in accordance with embodiments of the present disclosure.
Figure 4C:
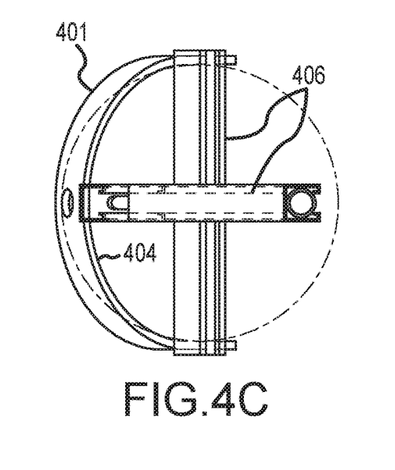
FIG. 4C is a perspective view of another embodiment of a valve interfacing device, in accordance with embodiments of the present disclosure.

FIGS. 4A and 4C illustrate top and perspective views, respectively, of another embodiment of a valve interfacing device 401. In this embodiment, the valve interfacing device 401 includes an arcuate valve interfacing surface 404 having a substantially semi-circular or annular shape. In some other embodiments, the interfacing surface 404 may extend further along the curvature to form an open ring. In one or more embodiments, the valve interfacing device 401 may be coupled to one or more reinforcing arms 406 in a configuration such that one or more reinforcing arms 406 connects to a medial portion of the valve interfacing device 401 and extends substantially across the diameter of the annular shape.

In some embodiments, and as illustrated in FIGS. 4A and 4C, two reinforcing arms 406 are positioned perpendicular to and overlapping each other, contacting the valve interfacing device 401 at three points. In some embodiments, the reinforcing arms 406 are integrated as one X-shaped structure rather than formed from two overlapping arms. The reinforcing arms 406 may have openings formed therein to reduce material and weight. In some embodiments, the reinforcing arms 406 may have a skeletal structure to reduce the weight to the reinforcing arms 406 and overall weight of the tool and yet strengthen the one or more valve interfacing surfaces 404 when lifting a heavy compressor valve. In addition, the reinforcing arms 406 can be any appropriate shape. For example, in some embodiments, the reinforcing arms 406 can have circular cross-sections. In other embodiments, the reinforcing arms 406 can have square cross-sections to add strength. In some embodiments, the interfacing surface may have a closed or overlapping ring shape to position around, interface with, and abuttingly contact a similarly-sized, ring-shaped outer surface of a heavy compressor valve. In certain such embodiments, the ring shaped interfacing surface may be coupled to a reinforcing arm such that the reinforcing arm substantially bisects the ring shape.

Figure 4D:
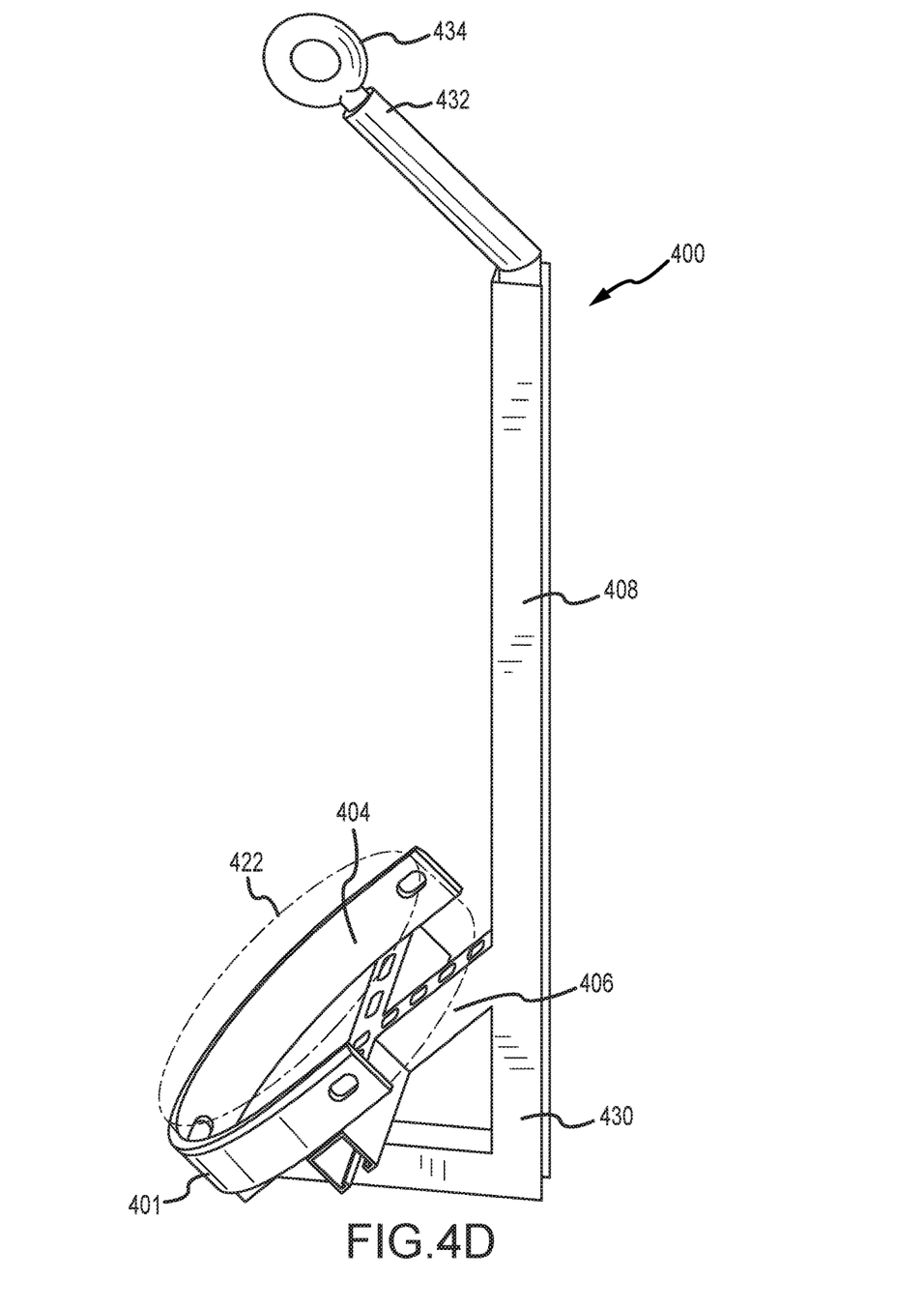
FIG. 4D is a perspective view of a lifting tool, in accordance with embodiments of the present disclosure.
Figures 5A, 5B:
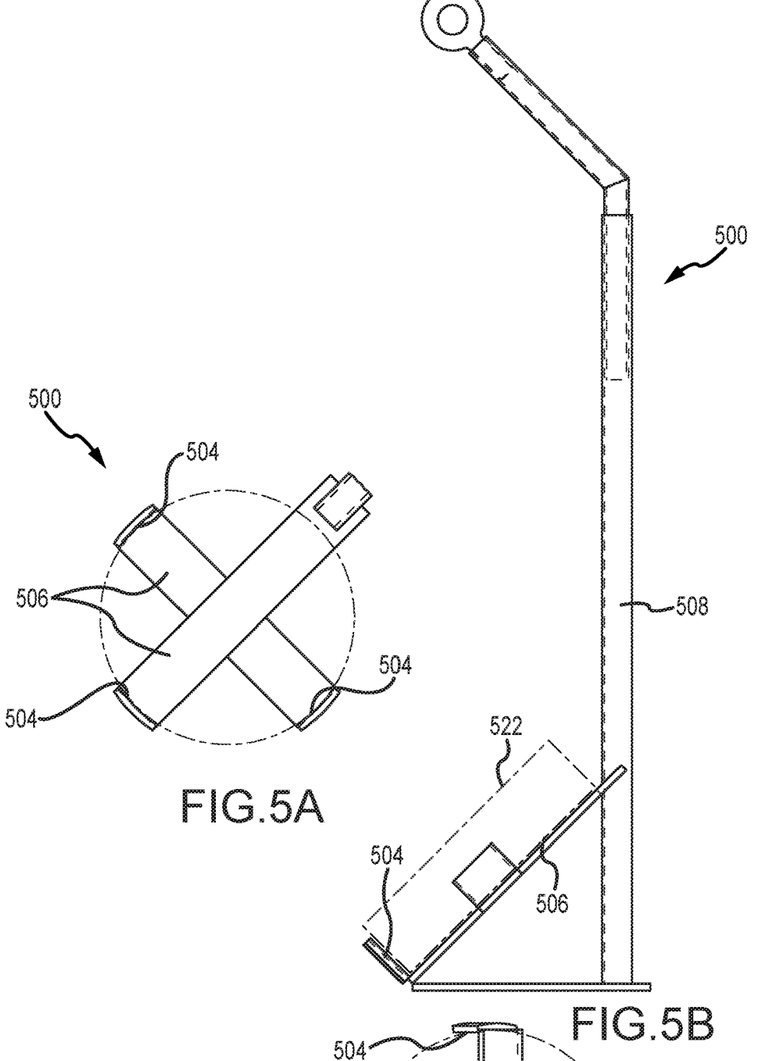
FIGS. 5A-5D are front, side, bottom, and perspective views, respectively, of another embodiment of a lifting tool, in accordance with embodiments of the present disclosure.
Figure 5C:
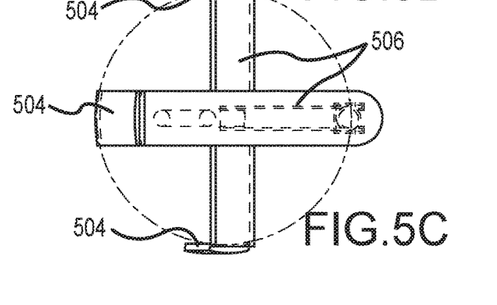
Figure 5D:
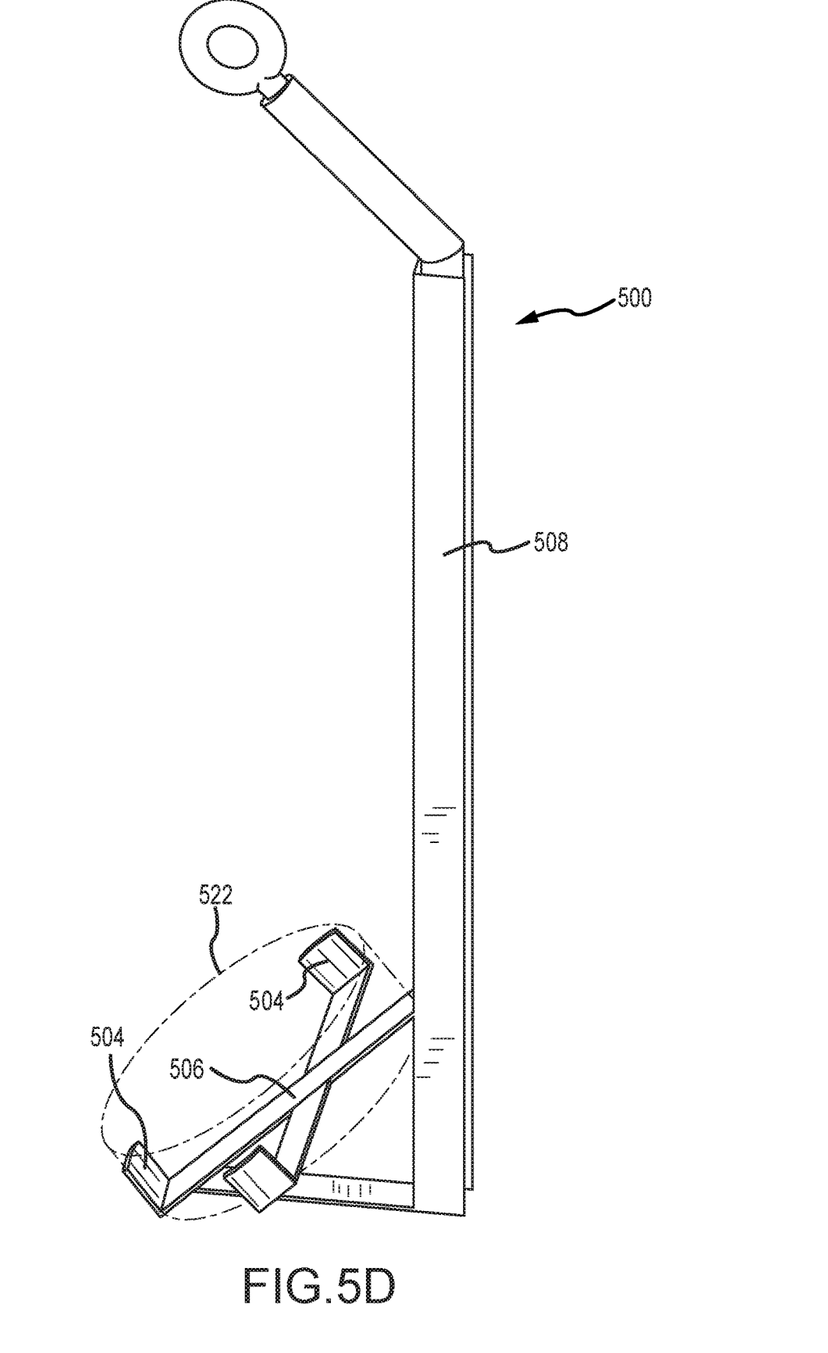

FIGS. 4B and 4D illustrate side and perspective views, respectively, of a lifting tool 400 having the valve interfacing device 401 and the reinforcing arms 406 coupled to a tool lifting arm 408. In some embodiments, the tool lifting arm 408 includes a distal end 430 connected to the one or more reinforcing arms 406 and a proximal end 432 having a coupling feature 434 by which the lifting arm 408 can be coupled to the lifting mechanism 110 (FIG. 1). During operation and when lifting a compressor valve, the compressor valve, indicated by dashed line 422, will be retained within the valve interfacing device 401 and in some embodiments, resting on the reinforcing arms 406. In some embodiments, the reinforcing arms 406 and the lifting arm 408 may be formed integrally as a single structure. Alternatively, the reinforcing arms 406 and the lifting arm 408 may be formed as separate components coupled together.

This application is a continuation, and claims priority to, and the benefit of, U.S. Non-Provisional application Ser. No. 15/907,582, filed Feb. 28, 2018, titled "Heavy Compressor Valve Lifting Tool and Associated Methods," which claims priority to U.S. Provisional Patent Application. No. 62/465,012, filed Feb. 28, 2017, titled "Heavy Compressor Valve Lifting Tool and Associated Methods," each of which is incorporated herein by reference in their entireties.

FIGS. 5A-5D illustrate front, side, bottom, and perspective views, respectively, of a lifting tool 500. In this embodiment, valve interfacing surfaces 504 are integrated with reinforcing arms 506, in which the valve interface surfaces 504 extend substantially orthogonally from the reinforcing arms 506, forming arcuate surfaces within which a compressor valve, represented by dashed line 522, can be positioned and lifted. The reinforcing arms 506 may be coupled to a lifting arm 508 at an angle to facilitate engagement with the compressor valve.

That claimed is:

1. A heavy compressor valve removal tool to remove and lift heavy compressor valves, the tool comprising:
  a weight bearing annularly-shaped valve interfacing surface to interface with an outer surface of a perimeter of a compressor valve when positioned adjacent the compressor valve, the valve interfacing surface conforming to a shape of the outer surface of the compressor valve, to bear the weight of the compressor valve when the compressor valve is lifted, and to underlie the compressor valve when the weight bearing valve interfacing surface interfaces with the outer surface of the compressor valve;
  one or more reinforcing arms connected to the valve interfacing surface, the one or more reinforcing arms being substantially parallel to the compressor valve when the valve interfacing surface interfaces with the outer surface of the compressor valve, and wherein the one or more reinforcing arms connect to a medial portion of and extend substantially across the diameter of the annular valve interfacing surface;
  one or more tool lifting arms connected to the one or more reinforcing arms at a first end of the one or more tool lifting arms proximate the one or more reinforcing arms; and
  a lifting mechanism connected to the one or more tool lifting arms at a second end of the one or more tool lifting arms opposite the first end, the heavy compressor valve removal tool adapted to lift the compressor valve when the valve interfacing surface interfaces with the outer surface of the compressor valve.

2. The tool of claim 1, wherein the lifting mechanism comprises an industrial crane.

3. The tool of claim 1, wherein the one or more reinforcing arms comprises a beam member arm having one or more of: (a) a plurality of openings formed in the beam member arm; and (b) a skeletal structure, to thereby reduce the weight of the beam member and overall weight of the tool and yet strengthen the valve interfacing surface when lifting the compressor valve.

4. The tool of claim 1, wherein the annular shape of the interface surface comprises a ring to interface with a similarly-sized, ring-shaped outer surface of the compressor valve, and wherein the one or more reinforcing arms comprises a reinforcing arm that substantially bisects the ring of the tool.

5. The tool of claim 1, wherein the one or more reinforcing arms have a square cross-section.

6. A method of lifting a heavy compressor valve with a heavy compressor valve lifting tool, the method comprising:
    positioning a weight bearing annular valve interfacing surface of the heavy compressor valve lifting tool adjacent and to underlie an outer surface of a perimeter of a compressor valve so that the weight bearing valve interfacing surface bears the weight of the compressor valve when the compressor valve is moved away from an associated compressor;
    securing the valve interfacing surface of the heavy compressor valve lifting tool against the outer surface of the compressor valve; and
    moving the compressor valve away from the compressor with a lifting mechanism connected to the heavy compressor valve lifting tool
    wherein the heavy compressor valve lifting tool further comprises one or more reinforcing arms connected to the one or more valve interfacing surfaces; and
    wherein the one or more reinforcing arms connects to a medial portion of and extends substantially across the diameter of the annular valve interfacing surface.

7. The method of claim 6, wherein the heavy compressor valve lifting tool further comprises:
    one or more tool lifting arms connected to the one or more reinforcing arms at a first end of the one or more tool lifting arms; and
    wherein the lifting mechanism is connected to the one or more tool lifting arms at a second end of the one or more tool lifting arms, the heavy compressor valve removal tool adapted to lift the compressor valve when the valve interfacing surface interfaces with the outer surface of the compressor valve.

8. The method of claim 7, wherein the lifting mechanism comprises an industrial crane.

9. The method of claim 7, wherein the one or more reinforcing arms comprises a beam member arm having one or more of: (a) a plurality of openings formed in the beam member arm; and (b) a skeletal structure, to thereby reduce the weight to the beam member and overall weight of the tool and yet strengthen the valve interfacing surface when lifting the compressor valve.

10. The method of claim 7, wherein the annular shape of the interface surface comprises a ring to interface with a similarly-sized, ring-shaped outer surface of the compressor valve, and wherein the one or more reinforcing arms comprises a reinforcing arm that substantially bisects the ring of the tool.

11. The method of claim 7, wherein one or more reinforcing arms has a square cross-section.

12. The method of claim 6, further comprising: manipulating the compressor valve with the heavy compressor valve lifting tool as required to gain access to the compressor.

* * * * *